United States Patent
Li

(10) Patent No.: US 10,528,745 B2
(45) Date of Patent: *Jan. 7, 2020

(54) METHOD AND SYSTEM FOR IDENTIFICATION OF SECURITY VULNERABILITIES

(71) Applicant: Assured Enterprises, Inc., Reston, VA (US)

(72) Inventor: David Li, Reston, VA (US)

(73) Assignee: Assured Enterprises, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/971,169

(22) Filed: May 4, 2018

(65) Prior Publication Data

US 2018/0253558 A1 Sep. 6, 2018

Related U.S. Application Data

(63) Continuation of application No. 14/876,592, filed on Oct. 6, 2015, now Pat. No. 9,977,905.

(51) Int. Cl.
*H04L 29/06* (2006.01)
*G06F 21/57* (2013.01)
*G06F 21/56* (2013.01)

(52) U.S. Cl.
CPC .......... *G06F 21/577* (2013.01); *G06F 21/564* (2013.01); *H04L 63/1416* (2013.01); *H04L 63/1433* (2013.01); *G06F 2221/033* (2013.01)

(58) Field of Classification Search
CPC .................................................... G06F 21/577
See application file for complete search history.

(56) References Cited

U.S. PATENT DOCUMENTS 7,552,480 B1 6/2009 Voss
7,845,007 B1 11/2010 Kennis
(Continued)

FOREIGN PATENT DOCUMENTS

WO 2011/068967 6/2011

OTHER PUBLICATIONS

International Search Report and Written Opinion, PCT Patent Application No. PCT/US2016/055273, dated Jan. 13, 2017; 15 pages.

(Continued)

*Primary Examiner* — Shawnchoy Rahman
(74) *Attorney, Agent, or Firm* — Baker Botts L.L.P.

(57) ABSTRACT

A system for securing an electronic device may include a processor and a memory. The memory may be communicatively coupled to the processor and include instructions. The instructions, when loaded and executed by the processor, cause the processor to scan data including one or more application components to uniquely identify elements therein, determine from a given application component additional components to be accessed by the given application component, scan the additional components to uniquely identify elements therein, determine whether the additional components include any known vulnerabilities, associate one or more known vulnerabilities of the additional components with the given application component, record the known vulnerabilities and the given application component. The given application component may be uniquely identified.

39 Claims, 4 Drawing Sheets

(56) References Cited

U.S. PATENT DOCUMENTS

| | | |
|---|---|---|
| 8,453,246 B2 | 5/2013 | Lang |
| 8,484,753 B2 | 7/2013 | Nojiri |
| 8,839,441 B2 | 9/2014 | Saxena |
| 2002/0104014 A1 | 8/2002 | Zobel |
| 2003/0212779 A1* | 11/2003 | Boyter .................. H04L 41/22 709/223 |
| 2004/0064726 A1 | 4/2004 | Girouard |
| 2007/0055829 A1* | 3/2007 | Rudelic ............... G06F 21/562 711/149 |
| 2008/0163185 A1 | 7/2008 | Goodman |
| 2008/0244691 A1 | 10/2008 | Hilerio et al. |
| 2009/0031206 A1 | 1/2009 | Aureilia |
| 2010/0299179 A1 | 11/2010 | Alonso |
| 2011/0321164 A1* | 12/2011 | Saxena ............... G06F 21/577 726/25 |
| 2012/0203590 A1 | 8/2012 | Deb |
| 2012/0222123 A1 | 8/2012 | Williams et al. |
| 2013/0167238 A1* | 6/2013 | Russell ............... G06F 21/577 726/25 |
| 2013/0247204 A1 | 9/2013 | Schrecker |
| 2013/0333032 A1 | 12/2013 | Delatorre et al. |
| 2014/0123279 A1 | 5/2014 | Bishop et al. |
| 2015/0011353 A1 | 4/2015 | Song |

OTHER PUBLICATIONS

Levine, John R. "Linkers & Loaders" (1999); 299 pages.
International Preliminary Report on Patentability, PCT Patent Application No. PCT/US2016/055273, dated Jan. 13, 2017; 11 pages.
Extended European Search Report for European Patent Application No. 16854157.1, dated Apr. 10, 2019; 6 pages.

* cited by examiner

METHOD AND SYSTEM FOR IDENTIFICATION OF SECURITY VULNERABILITIES

PRIORITY CLAIM

This application claims priority to and is a continuation of U.S. patent application Ser. No. 14/876,592, filed Oct. 6, 2015, titled "METHOD AND SYSTEM FOR IDENTIFICATION OF SECURITY VULNERABILITIES", which is hereby incorporated by reference in its entirety.

TECHNICAL FIELD OF THE INVENTION

Embodiments of the present invention relate generally to security of electronic devices and systems and, more particularly, to identification of security vulnerabilities

BACKGROUND

Computer systems may include many elements communicatively coupled to one another via a network. Networking and sharing of elements adds a level of complexity that is not present with a single element that stands alone. Network and system administrators may manage network elements using various software tools, which may include a graphical user interface.

Application code may run on computer systems. One application may have code running on various elements of a computer system. The application itself may be managed by network or system administrators using various software tools.

Malware may attack computer systems. Malware may include spyware, rootkits, password stealers, spam, sources of phishing attacks, sources of denial-of-service-attacks, viruses, loggers, Trojans, adware, or any other digital content that produces malicious activities. Furthermore, an application may be vulnerable to malware or other exploitative attacks.

SUMMARY

In one embodiment, a system for securing an electronic device includes a processor and a memory. The memory may be communicatively coupled to the processor and include instructions. The instructions, when loaded and executed by the processor, cause the processor to scan data including one or more application components to uniquely identify elements therein, determine from a given application component additional components to be accessed by the given application component, scan the additional components to uniquely identify elements therein, determine whether the additional components include any known vulnerabilities, associate one or more known vulnerabilities of the additional components with the given application component, record the known vulnerabilities and the given application component. The given application component may be uniquely identified.

In another embodiment, a machine readable storage medium may include computer-executable instructions that are readable by a processor. The instructions, when read and executed, may be for causing the processor to scan data including one or more application components to uniquely identify elements therein, determine from a given application component additional components to be accessed by the given application component, scan the additional components to uniquely identify elements therein, determine whether the additional components include any known vulnerabilities, associate one or more known vulnerabilities of the additional components with the given application component, record the known vulnerabilities and the given application component. The given application component may be uniquely identified.

In yet another embodiment, a method of securing an electronic device may include scanning data including application components to uniquely identify elements therein, determining from a given application component additional components to be accessed by the given application component, scanning the additional components to uniquely identify elements therein, determining whether the additional components include any known vulnerabilities, associating one or more known vulnerabilities of the additional components with the given application component, and recording the known vulnerabilities and the given application component. The given application component may be uniquely identified.

In one embodiment, a system may include a memory. The memory may be communicatively coupled to the processor and include instructions. The instructions, when loaded and executed by the processor, cause the processor to identify one or more application components uniquely identified and determine vulnerabilities associated with a given application component. The vulnerabilities may include vulnerabilities of additional components to be accessed by the given application component. The processor may be caused to adjust characterizations of the vulnerabilities associated with the given application component based upon contextual information from the system in which the given application component resides. The contextual information may include security information.

In another embodiment, a machine readable storage medium may include computer-executable instructions that are readable by a processor. The instructions, when read and executed, may be for causing the processor to identify one or more uniquely identified application components and determine vulnerabilities associated with a given application component. The vulnerabilities may include vulnerabilities of additional components to be accessed by the given application component. The processor may be caused to adjust characterizations of the vulnerabilities associated with the given application component based upon contextual information from the system in which the given application component resides. The contextual information may include security information.

In yet another embodiment, a method may include identifying one or more application components uniquely identified and determining vulnerabilities associated with a given application component. The vulnerabilities may include vulnerabilities of one or more additional components to be accessed by the given application component. The method may include adjusting characterizations of the vulnerabilities associated with the given application component based upon contextual information from the system in which the given application component resides. The contextual information may include security information.

BRIEF DESCRIPTION OF THE FIGURES

For a more complete understanding of the configurations of the present disclosure, needs satisfied thereby, and the objects, features, and advantages thereof, reference now is made to the following description taken in connection with the accompanying drawings.

DETAILED DESCRIPTION

Figure 1:
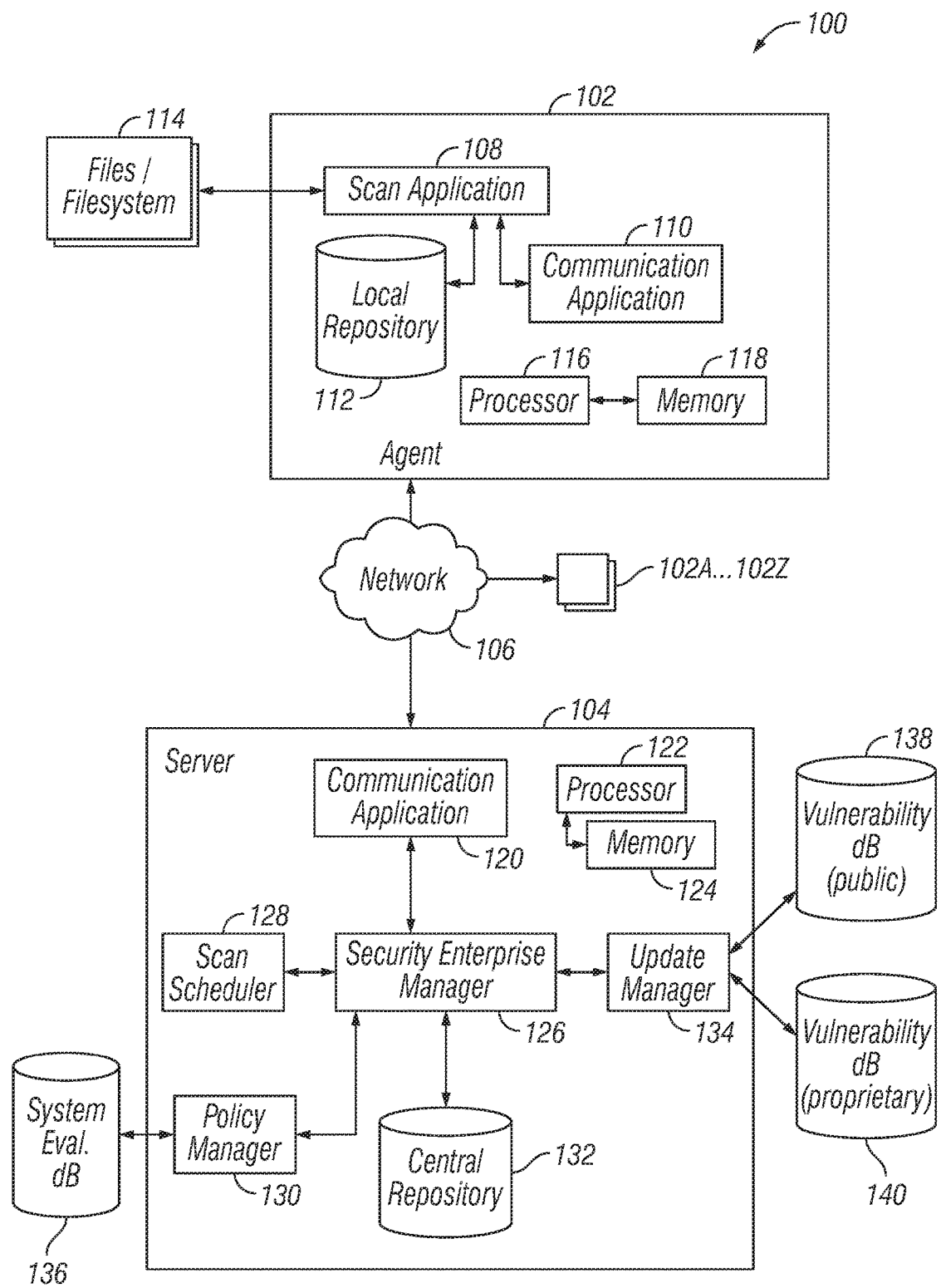
FIG. 1 is a block diagram of an example system for identifying security vulnerabilities, in accordance with the teachings of the present disclosure.

FIG. 1 is an illustration of an example embodiment of a system 100 for identifying security vulnerabilities, in accordance with the teachings of the present disclosure. System 100 may include any suitable number and kind of elements. For example, system 100 may include one or more devices that can identify security vulnerabilities by scanning electronic devices, file systems, Java applications, .NET applications, or other sources of electronic data. Such scanning may be performed locally to the source of electronic data or remotely on another electronic device communicatively coupled through a network to the source of electronic data. For example, system 100 may include one or more agents 102 configured to scan sources of electronic data for vulnerabilities. In another example, system 100 may include a server 104 configured coordinate scanning sources of electronic data for vulnerabilities. System 100 may include any suitable number and kind of source of electronic data, such as files or file system 114, that may be scanned for vulnerabilities. Although file system 114 is shown separate from any clients or servers, file system 114 may be resident on the same device as client 102 or server 104.

Server 104 may be configured to coordinate scanning of various sources of information by agents 102. Server 104 may be implemented in any suitable manner, including by one or more applications, scripts, libraries, modules, code, drivers, or other entities on an electronic device. These may include software or instructions resident on a memory 124 for execution by a processor 122. Although sever 104 is illustrated in FIG. 1 as including example elements, server 104 may include more or less elements. Moreover, the function of some elements of server 104 as discussed herein may be performed in various embodiments by other elements of server 104. Also, the function of some elements of server 104 as discussed herein may be performed in various embodiments by elements of client 102. For example, server 104 may include a communication application 120, security enterprise manager 126, update manager 134, scan scheduler 128, policy manager 130, or a central repository 132.

Client 102 may be configured scan various sources of information such as file system 114. Client 102 may be implemented in any suitable manner, including by one or more applications, scripts, libraries, modules, code, drivers, or other entities on an electronic device. These may include software or instructions resident on a memory 118 for execution by a processor 116. Although client 102 is illustrated in FIG. 1 as including example elements, client 102 may include more or less elements. Moreover, the function of some elements of client 102 as discussed herein may be performed in various embodiments by other elements of client 102. For example, client 102 may include a communication application 110, scan application 108, and local repository 112. Client 102 may communicate with server 104 through network 106.

Client 102 and server 104 may communicate with sources of information about vulnerability of software. Any suitable sources of information may be utilized by client 102 and server 104. For example, server 104 may communicate with one or more vulnerability databases 138, 140. Database 138 may be a publicly accessible vulnerability database, while database 140 may be a proprietary vulnerability database. Although a single such database 138, 140 is shown and described, multiple public or proprietary databases may be accessed. Database 138 may include the National Vulnerability Database (NVD). Database 138 may include a repository of standards-based vulnerability management data. The database may further include databases of security checklists, security related software flaws, misconfigurations, product names, product versions, exploitability metrics, impact metrics, temporal metrics, environmental metrics, and others. Server 104 may communicate with a system evaluation database 136, which may include information about the overall health of a system in which file system 114 (or other data under evaluation) resides. Each of these databases may be implemented in any suitable manner, such as by a relational database, navigational database, or other organization of data and data structures. Server 104 may integrate the contents from these databases to provide comprehensive coverage of known vulnerabilities.

Communication application 120 and communication application 110 may be configured to handle inbound and outbound communications to other entities for server 104 and client 102. For example, communication application 120 and communication application 110 may handle communications with file system 114, databases 138, 140, 126, and between server 104 and client 102. Communication application 120 and communication application 110 may be implemented by any suitable mechanism, such as an application, function, library, application programming interface, script, executable, code, software, or instructions. These may in turn be implemented by instructions resident in memory for execution by a processor that, when loaded into the processor, cause the functionality described in this disclosure to be performed.

Security enterprise manager 126 may be configured to organize scanning operations in system 100. Security enterprise manager 126 may determine, for example, what agents 102 need to scan their respective sources of data, how agents 102 will scan, how information will be reported from agents 102, what remedial action might be taken or recommended, when agents 102 will be updated, and other such configurations and operations of system 100. Security enterprise manager 126 may utilize a scan scheduler 128 to determine or dictate how often and under what conditions scans of data will be made and repeated. Furthermore, security enterprise manager 126 may utilize an update manager 134 to determine or dictate how often and under what conditions information to be used by scan application 108 will be updated. Update manager 134 may be configured to gather information from one or more sources about how to scan data, such as database 138, 140, 136. Update manager 134 may be configured to store relevant information to be used by agents 102 in central repository 132. Contents from central repository 132 may be selectively provided to agents 102 by update manager. Security enterprise manager 126 may utilize a policy manager 130 configured to analyze the overall health of a system under evaluation. Policy manager 130 may be configured to access information from, for example, system evaluation database 136. Security enterprise manager 126, update manager 134, scan scheduler 128, and policy manager 130 may be implemented by any suitable mechanism, such as an application, function, library, application programming interface, script, executable, code, software, or instructions. These may in turn be implemented by instructions resident in memory for execution by a processor that, when loaded into the processor, cause the functionality described in this disclosure to be performed.

Scan application 108 may be configured to scan data under evaluation in system 100. The data may be located on the same electronic device as scan application 108 or on an electronic device communicatively coupled to scan application 108. Scan application may analyze the data under evaluation to determine whether the data indicates any vulnerabilities to users of the data. Scan application may utilize a local repository 112 to hold rules, guidelines, settings, or other data collected by server 104. Local repository 112 may be implemented by any suitable manner of implementing databases or other data structures. Scan application 108 may be configured to scan data, such as those in file system 114, at any appropriate time. Scan application 108 may be implemented by any suitable mechanism, such as an application, function, library, application programming interface, script, executable, code, software, or instructions. These may in turn be implemented by instructions resident in memory for execution by a processor that, when loaded into the processor, cause the functionality described in this disclosure to be performed.

In operation, scan application 108 may search for holes, vulnerabilities, or other possible exploitations in software. Such software may include files in file system 114. Scan application may look for signatures of software binaries that are defined in local repository 112. Such signatures may be imported from original sources, such as databases 138, 140. Scan application 108 may search and scan software located on a given computer, desktop, smartphone, tablet, or other suitable electronic device. In some embodiments, scan application 108 may search and scan a defined installation image that is to be installed on multiple clients. Scan application 108 may identify files or subcomponents or files in file system 114 that have been identified as having a vulnerability. In some embodiments, such a file might not be malicious itself, but may be exploitable by malware.

The memories may be in the form of physical memory or pages of virtualized memory. The processors may comprise, for example, a microprocessor, microcontroller, digital signal processor (DSP), application specific integrated circuit (ASIC), or any other digital or analog circuitry configured to interpret and/or execute program instructions and/or process data. In some embodiments, the processor may interpret and/or execute program instructions and/or process data stored in memory. Memory may be configured in part or whole as application memory, system memory, or both. Memory may include any system, device, or apparatus configured to hold and/or house one or more memory modules. Each memory module may include any system, device or apparatus configured to retain program instructions and/or data for a period of time (e.g., computer-readable storage media). Instructions, logic, or data for configuring the operation of the system may reside in memory for execution by the processor. Program instructions may be used to cause a general-purpose or special-purpose processing system that is programmed with the instructions to perform the operations described above. The operations may be performed by specific hardware components that contain hardwired logic for performing the operations, or by any combination of programmed computer components and custom hardware components.

Figure 2:
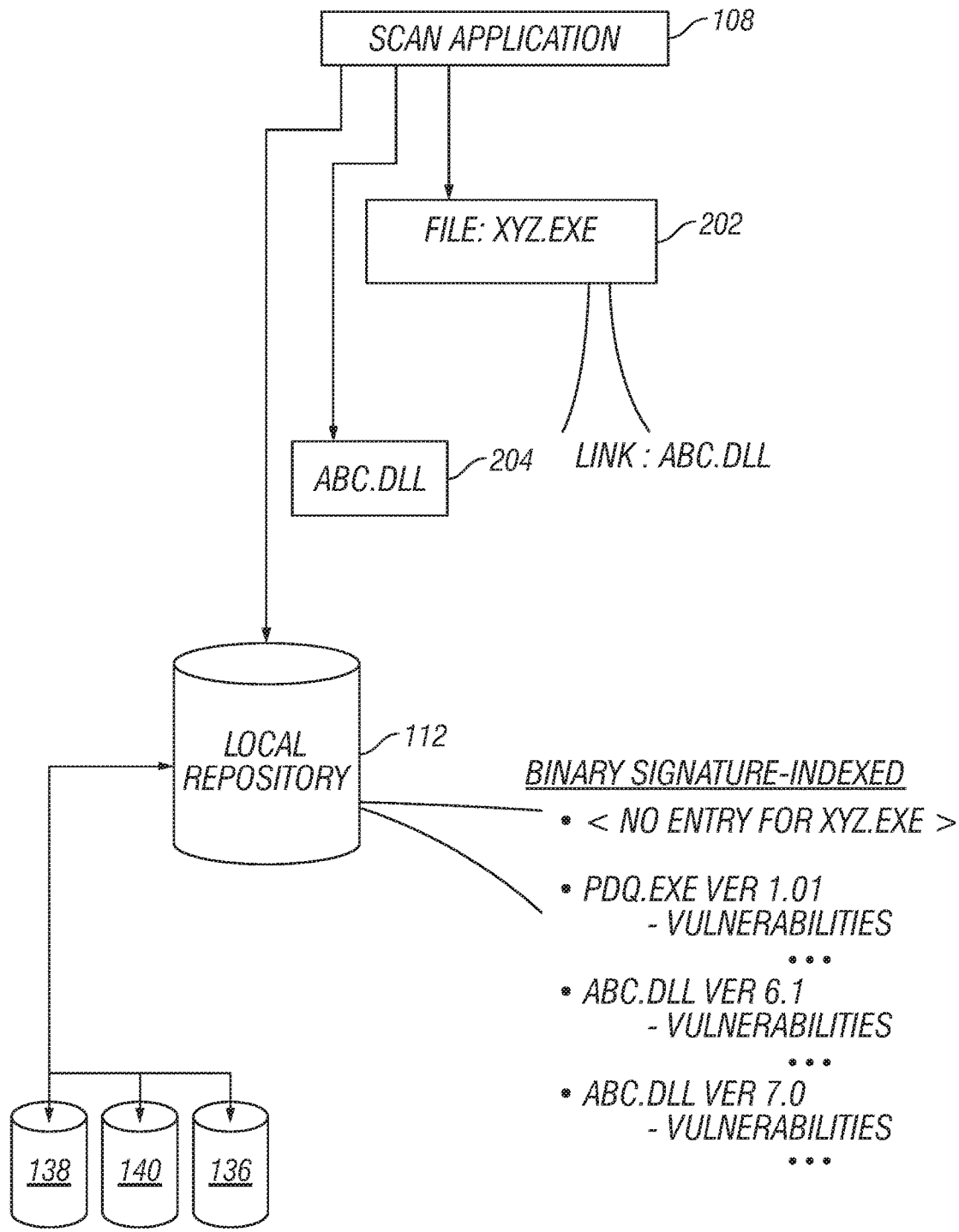
FIG. 2 is an illustration of example operation and further configuration of the system for identifying security vulnerabilities, in accordance with the teachings of the present disclosure.

FIG. 2 is an illustration of operation of system 100 and of further configuration thereof, in accordance with embodiments of the present disclosure. Scan application 108 may be scanning a sequence of files on file system 114. Scan application 108 may encounter a given file, such as XYZ.exe 202. Scan application 108 may determine a unique identification of the file. In one embodiment, scan application 108 may determine the actual contents of XYZ.exe 202 by determining a signature, hash, or other unique digital identifier of XYZ.exe 202. The unique identification may precisely identify the version, build, or other particular instance of XYZ.exe, of which there may be many versions or completely different sources.

Scan application 108 may check whether the signature of XYZ.exe 202 matches any known software elements populated in local repository 112. If there are any known vulnerabilities of XYZ.exe 202 noted in local repository 112, they may be noted. The entries of local repository 112 may be marked or indexed according to a hash, signature, or other identifier. Moreover, the vulnerabilities may be categorized or defined by a unique identifier, so that consumers of the results from scan application 108 may efficiently apply its results.

Many files might not be known to be safe or vulnerable, as myriad different software creators create myriad different pieces of software. Accordingly, in one embodiment scan application 108 might not find an indication of XYZ.exe 202 in local repository 112. The existing binary signature and use of scanning of top-level applications may be of little use. As shown in FIG. 1, there might not be an entry for XYZ.exe 202 therein. Alternatively, there may be an entry denoting that XYZ.exe has no known vulnerabilities. Based upon either such case, in one embodiment scan application 108 might determine that XYZ.exe 202 itself has no known vulnerabilities.

However, in some embodiments a file might make use of still other files. For example, a file might access other files by calling external functions. These external functions might be executed in, for example, a shared library. The compiled binaries of the shared library may be statically or dynamically linked, included, or otherwise associated with the binaries of the original file. For example, XYZ.exe 202 may be dynamically linked to a DLL such as ABC.dll 204. Many applications might be linked to, share, and use such a file.

In one embodiment, scan application 108 may determine the set of libraries or other external code that are to be accessed by a given file. Scan application 108 may analyze the software and application file structure to identify such components. An application executable may be in a portable executable format. The format may include a data structure that contains the information needed for the operating system loader to manager the wrapped executable code. The file format may begin with a header that specifies information about the code in the file, the type of application, required library headers, and space requirements. The header may further specify an import table that identifies functions used by the file to access external components and the locations of such functions. Scan application 108 may parse this information to determine what external components, libraries, or other entities that XYZ.exe 202 executes, such as ABC.dll 204. Any suitable file format or structure may be parsed and analyzed by scan application 108 to determine the wrappings or packaging to identify external components used by the file.

In some cases, required components such as shared library may be stored as separate files in the file system. In other cases, required components may be embedded in the executables themselves. When additional required components are stored as separate files, some file-based scanners cannot associate the identified vulnerabilities to the correct executables that ultimately use the required components. When required components are embedded in the executables themselves, some file-based scanners will miss the executables as-incorporating the required components because the binary signatures do not exist for the executable files as they exist while incorporating these required components. However, in either case scan application 108 may identify the types of applications or executables based on a specific operating system, file extensions, other file attributes, and the file signatures. The file signatures may include hex codes around the beginning of the files, known as "magic numbers". Based on the types of applications, the executable file structures can be known, as well as the required components. From these, potential vulnerable system calls may be identified. For example, an application .EXE file (an executable application with file extension "exe" on Windows™ Operating Systems) may use the Portable Executable (PE) file format. The PE file format is a data structure that contains the information necessary for the Windows™ Operating System loader to manage the wrapped executable code. The PE file format begins with a header that includes information about the code, the type of application, required library functions, and space requirements. Furthermore, the import table of the PE file header contains the information about specific functions used by this executable and the locations of these functions. For Linux/Unix-based executables, scan application 104 may use the dynamic loader of the system to examine the dynamic section of an executable to identify all needed components, such as shared libraries used by given dynamically-linked executables.

Scan application 108 may in turn scan these libraries based upon the determination. For example, scan application 108 may scan ABC.dll 204 after finding that it is linked to XYZ.exe 202. Moreover, in another embodiment the scan results of the linked library may be ascribed to the original file. For example, even if XYZ.exe itself was determined to have no vulnerabilities in local repository 112, the vulnerabilities of ABC.dll 204 denoted in local repository 112 may be subsequently associated with XYZ.exe.

Furthermore, as shown in FIG. 2, local repository 112 may have entries that are specific to individual versions of files. The vulnerabilities of different versions of the same file may be different. The vulnerabilities, directly or indirectly attributed to XYZ.exe, may be reported by scan application 108.

Figure 3:
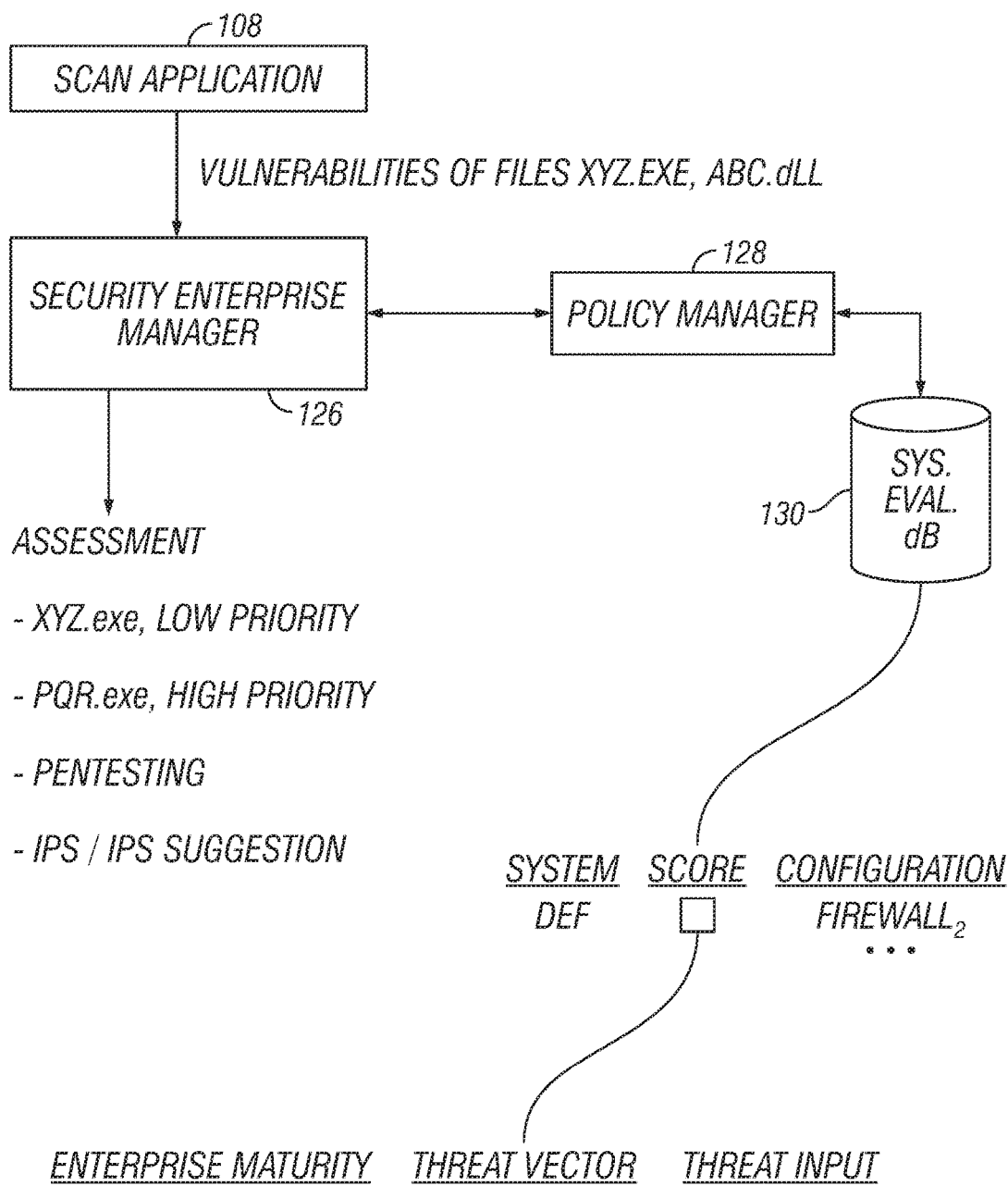
FIG. 3 is an illustration of further example operation of the system for identifying security vulnerabilities, in accordance with the teachings of the present disclosure.

FIG. 3 illustrates further example operation of system 100, in accordance with embodiments of the present disclosure. Upon completion of all or some of the scan of file system 114, scan application 108 may report vulnerabilities to other parts of system 100 for corrective action or reporting. In one embodiment, system 100 may utilize policy manager 130 to determine what corrective action or reporting is to be performed.

System 100 may handle different determined vulnerabilities in different ways. In one embodiment, system 100 may identify that a component has a vulnerability that is of a qualitatively or quantitatively higher or lower priority based upon the degree of malicious behavior available for malware. Such a component may include a file. In another embodiment, system 100 may identify that a component has a particular vulnerability, but that vulnerability is enhanced or lessened by other aspects of the system in which the file resides.

System evaluation database 136 may include a complete diagnostic evaluation of the system in which the file resides. For example, system evaluation database 136 include information about the candidate system, including whether it has firewalls, where such firewalls are located, what kind of firewalls exist, and how they are configured. In one embodiment, the interplay of the vulnerabilities of the files as determined by scan application 108 and the candidate system conditions from system evaluation database 136 may yield whether or not corrective action is necessary. In another embodiment, a prioritization of the corrective action or vulnerabilities may be produced. System evaluation database 136 may include information about the candidate system with any suitable number of permutations and combinations of security software, hardware, or settings thereof resident on the candidate system.

For example, if the particular instance of ABC.dll is known to be vulnerable to a particular network-based exploit, the vulnerability may be added to an evaluation of XYZ.exe 202. Security enterprise manager 128 may receive the vulnerability list. Security enterprise manager 128 may consult system evaluation database 136 to evaluate the system that included XYZ.exe 202 with respect to its configuration. Policy manager 128 may interpret an entry in system evaluation database 126 that the candidate system (for example, DEF) has a particular firewall installed with given settings. The settings of the particular firewall may be tuned to defeat the particular vulnerability identified in XYZ.exe 202 through its use of ABC.dll. Consequently, security enterprise manager 126 may rank the known vulnerability of XYZ.exe 202 qualitatively or quantitatively less than other vulnerabilities.

In some embodiments, security enterprise manager 128 may produce or infer a composite vulnerability measurement. The composite vulnerability measurement may be inferred from the vulnerability of identified individual components. For example, the composite vulnerability severity measurement may be a weighted aggregate of individual severity measurements. For example, base, temporal, and environmental factors may be used. The weights associated with vulnerabilities of each factor may be customized, or industry-standard weights may be used. Each of these factors may include a sub-group of related factors. Furthermore, each group may produce a composite quantitative score with a vector used to illustrate the components used to derive the score.

In one embodiment, through policy manager 128 and system evaluation database 136, security enterprise manager 128 may contextualize standard metrics received from databases 138, 140 based upon specific characteristics of the candidate system. For example, as discussed above, the firewall used in the candidate system may be considered. In another embodiment, policy manager 128 may characterize the security operating environment of the candidate system using a three-dimensional mathematical model. In various embodiments, the three dimensions may include threat vector, threat impact, and enterprise maturity of cyber defense. A threat vector may refer to the path or mechanism that potential attackers employ to gain access to a computer, a system, or an enterprise. Identification of the vectors provides the insights of how the attackers (or other threat agents) exploit the associated vulnerabilities. The threat impact may refer to the impact when those vulnerabilities are successfully exploited. There are a wide range of different impacts that may be categorized or quantified, including but not limited to data loss, confidentiality compromise, loss of revenue, damages to the systems, etc. In some embodiments, the ranking of a specific vulnerability will be boosted if it associated with an application that in turn is associated with any critical enterprise asset. The enterprise maturity may refer to a wide range of enterprise assessments, including organization architecture, networks software/application, computing infrastructure wireless, intrusion detection/prevention, access control, security policy, risk assessment, data flow, configure management, enterprise application, data integrity, enterprise monitoring, physical security, contingency management, operating environment, and backup service. In the end, a composite score may be given to measure the enterprise cyber maturity.

While these enterprise characteristics may be manifest themselves by impacting standard scoring as described above, they may be uniquely considered together. For example, from system evaluation database 136 may include information from an audit that security controls may have been in place in DEF such as firewalls, intrusion detection systems, intrusion prevention systems. These components may affect metrics regarding threat access, access complexity, and target distribution. For example, the presence of a modern firewall might make the access difficult and increase the complexity of the manner of attacking because the attackers have to determine a more complex manner of bypassing the firewall to be able to successfully exploit the identified vulnerability. The target distribution may refer to the proportion of the impacts to the vulnerable system due to a specific identified vulnerability. For example, firewalls may be used to establish multiple security zones. If one security zone is compromised, the proportion of impact would be limited to that security zone.

In another example, the location of the vulnerability, such as the machine on which it resides, may be included in evaluating the vulnerability if it is co-located with identified critical enterprise assets. In such a case, the vulnerability risk or threat level may be increased. The contextualization of the threat may be increased or decreased by applying specific weights in response to these determinations. The weight might be applied to individual metrics. The individual metrics may include Access Vector, Access Complexity, Authentication, Confidential Impact, Integrity Impact, Availability Impact, Exploitability, Remediation Level, Report Confidence, Collateral Damage Potential, Target Distribution, Confidentiality, Integrity Requirement, and Availability Requirement. The access vector may reflect how the vulnerability is exploited. The access complexity may measure the complexity of the means required to exploit the vulnerability. The authentication may measure the number of times an attacker must authenticate to a target in order to exploit a vulnerability. An associated weight would provide additional insights on strength and complexity of the authentication process. The confidentiality impact may measure the impact on confidentiality of a successfully exploited vulnerability. The integrity impact may measure the impact to integrity of a successfully exploited vulnerability. The availability impact may measure the impact to availability of a successfully exploited vulnerability. The exploitability may measure how easy or available the attack is for malicious agents, such as the availability of easy-to-use exploit code. The remediation level may measure how urgent vulnerability needs to be dealt with due to the patch level. For example, the remediation level may be quantified based upon whether a temporary fix or workaround is available. The report confidence may measure the degree of confidence in the existence of a vulnerability. The collateral damage potential may measure the risk of loss of life or other physical assets. This may be typically related to what kind of business is served by the systems, as well as any emergency response policy and procedures that are in place. The target distribution may measure the proportion of impact of vulnerability system. The confidentiality, integrity, and availability requirement may measure the importance of the affected enterprise assets. The identification and classification of enterprise assets directly impact these measurements through weights or scores.

In one embodiment, security enterprise manager 126 may evaluate multiple vulnerabilities resulting from the file system and provide a ranked list of the vulnerabilities discovered during scanning. A given scan may yield hundreds or thousands of vulnerabilities, and corrective action for each may be expensive. The ranking may be used to prioritize patching of the most critical vulnerabilities first. When comparing the threat levels posed by different vulnerabilities, any suitable combination of factors may be considered. For example, the number of vulnerabilities for a given file, the severity of the vulnerabilities, and a confidence of identification of vulnerability may be used. A ranking score may be used that is a weighted aggregate of the individual measurements of each factor. These vulnerability measurements are further combined to produce the ranking of the identified vulnerabilities. The ranking is critical to enable enterprise prioritizing the limited resources to patch most critical vulnerabilities first. Multiple factors are involved in the consideration of ranking, for example, the number of vulnerability counts, the severity of vulnerability, and the confidence of identified vulnerability, etc. For example, if one shared component has more vulnerabilities associated with it or more application uses than another, then quantified counts of vulnerabilities or application uses would impact the ranking or importance of the component in the context of prioritizing remediation. The ranking score is generated as a weighted aggregate of the individual measurement of each factor.

Scan application 108 may run any suitable number of times. Scan scheduler 128 may dictate that a given file system may be scanned during specified, periodic, or customized times. Each scan operation may be performed independently from one another. Repeated scans at different times may yield additional insights through temporal correlation. For example, scanning the same target after a first scan and taking corrective action on identified vulnerabilities may provide an indication of the success of the corrective action. Security enterprise manager 126 may analyze successive scans and identify whether the corrective actions to be taken were successful.

For example, the corrective action to fix XYZ.exe 202 may be specified as an upgrade to the latest version. However, as the problem lied with ABC.dll 204, the upgrade to XYZ.exe 202 might not have fixed the problem and XYZ.exe 202 might still be vulnerable because of its use of ABC.dll. Security enterprise manager 126 may determine such a continued problem after a second scan and identify different remedial action, noting the previous attempt that failed to solve the problem. In another example, the new version of XYZ.exe 202 may itself have new vulnerabilities. Thus, the initial scan and corrective action may be insufficient to fully secure the candidate system. In yet another example, since a previous scan a new threat may have been identified to an existing version of XYZ.exe 202, or to a recently patched version of XYZ.exe 202. In still yet another example, the nature of an existing threat may have changed or evolved since a previous scan. Examples of such evolution may include cases where an effective exploit might have become more widely available, thus the potential number of attackers may have grown and the vulnerability is thus more sever. Accordingly, its ranking may need to be increased. In another case, a remediation may have become ineffective, particularly when a remediation was a temporary fix. Similarly, a more effective remediation may have been determined, and thus a vulnerability more easily patched. Successive scans may identify one or more of these examples and security enterprise manager 126 may change the vulnerability determinations accordingly. Accordingly, system 100 may provide protection based not only upon vulnerability but the responsiveness of counter-measures. In one embodiment, the responsiveness of counter-measures may be used as a factor for the contextualization discussed above.

In one embodiment, scanning may be repeated based upon the persistence or level of threats. For example, scan scheduler 128 may schedule repeated scans after a severe threat is attempted to be remediated. Furthermore, scan scheduler 128 may schedule a repeat scan for only those portions of the candidate system that have been changed with the corrective action. In another embodiment, an incremental scan may be used to speed up the scanning process. For example, security enterprise manager 126 may cause scanning of newly updated or changed parts of a candidate system. Scan application 108 may monitor a client system and report new changes. An incremental scan might be made for the newly identified changes to, for example, registry, application directories, and the file system. By limiting the scan to these elements, it might be performed more quickly.

Frequent scanning of an entire candidate system may be expensive in terms of time and resources. In one embodiment, scan scheduler 128 may take into account threat scores for a given system as represented in system evaluation database 136 to determine whether or not to perform a scan, or how often to perform a scan. For example, if system DEF includes a high threat score with respect to any two of the three factors of enterprise maturity, threat vector, and threat impact. An integral risk model [may specify an overall risk that the system may pose from the environmental factors, independent of specific application vulnerabilities for which scan application 108 may search. For example, there may be critical assets associated with the system or cyber defense measures associated with the system. These considerations as reflected in the assessment score model may constitute an integral risk model which may help to determine the recommended scan schedule. The costs of scanning may be weighed against this threat score by scan scheduler 128 to determine how often to scan.

In one embodiment, security enterprise manager 126 may take into account other scanning results in determining vulnerabilities. For example, security enterprise manager 126 may access or initiate scanning of operating system configurations or network devices. Such elements may be within the same system as the file system 114. The scans may determine settings or vulnerabilities within the host environment in which a candidate file exists. The results of such scans may be stored in system evaluation database 136. For example, a file might have a vulnerability, but its application may be configured to require an authentication before it can be exploited. Scanning the operating system or network settings may inform security enterprise manager 126 whether the operating system has been misconfigured such that the authentication for the file is not required, and thus the vulnerability might be worse.

In one embodiment, system evaluation database 136 may provide recommended remediation in the form of penetration testing, or pentesting. The suggested pentesting may be based upon the determined vulnerabilities from scanning and their associated severity. For example, consider that a given media player may be prone to various heap-based buffer-overflow, allowing attackers to execute arbitrary code to cause serious damages and data losses. These vulnerabilities may cause severe client-side exploitation risks, as the attacks may focus on client-side software applications such as web browser and email applications. In another example, the "heartbleed" vulnerability may be identified for a software widget, wherein an OpenSSL cryptographic software library vulnerability, widely used in applications, may allow stealing the information protected, under normal conditions, by the SSL/TLS encryption used to secure many part of the Internet. This vulnerability allows anyone from the outside to read memory of the enterprise system and compromises secret keys used for encryption. In response to such determined vulnerabilities from scanning, security enterprise manager 126 may identify additional software, modules, scripts, or corrective measures to be taken to perform pentesting on the identified vulnerabilities. Penetration testing applications may be loaded and the candidate system may be attacked to determine whether the candidate system is vulnerable to the identified attack. The penetration testing applications could include, for example, Metasploit Framework.

In another embodiment, security enterprise manager 126 may identify or create intrusion detection and intrusion protection rules from a knowledge base. These may be tailored to an identified vulnerability and configured to facilitate attack detection and protection. For example, once a media player vulnerability is identified, security enterprise manager 126 may identify rules to be applied to security software, wherein the rules are tailored to the vulnerability. For example, snort rule updates related to media player vulnerabilities may include specific protections against a zero length assertion heap overflow attempt, convolution filter heap information disclosure attempt, and byte array double free attempt. Each of these might be a different vector of attack upon the same media player. The rules may match the particular threat vector used to exploit the vulnerability. The rules may be accessed from, for example, a Snort intrusion prevention system.

Figure 4:
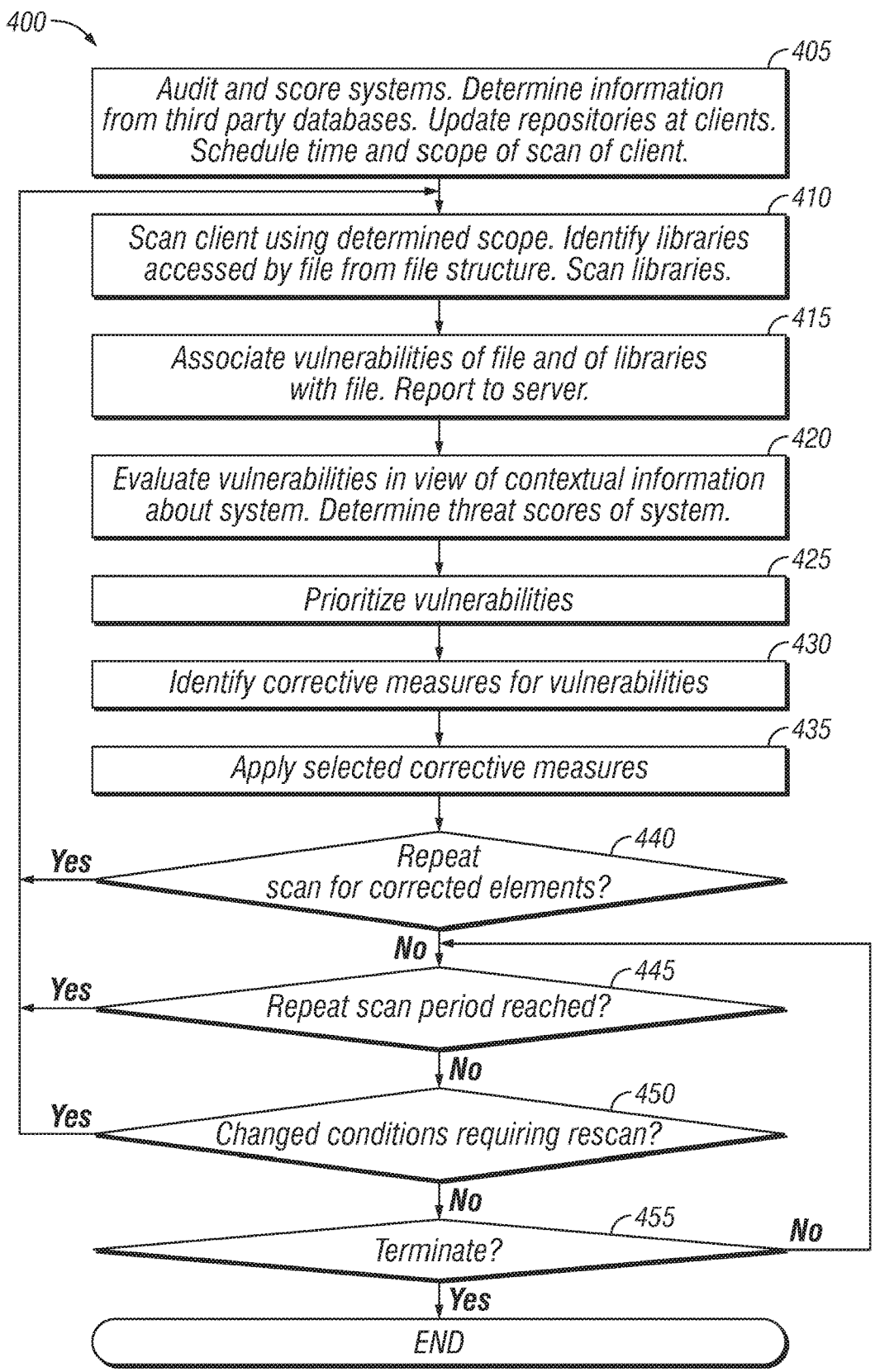
FIG. 4 is a flow chart of an example method for identifying security vulnerabilities, in accordance with the teachings of the present disclosure.

FIG. 4 is a flow chart of an example method 400 for identifying security vulnerabilities, in accordance with the teachings of the present disclosure. Method 400 may be implemented on any suitable device or system, such as those illustrated in FIGS. 1-3. Method 400 may include any suitable number or order of steps, and may begin at any suitable point. The steps of method 400 may be optionally repeated, whether entirely or individually. Moreover, method 400 may be performed by more or fewer steps than those illustrated below. Method 400 may be initiated by any suitable input. During performance, method 400 may return to previously performed steps or jump to other steps not yet performed. Various portions of method 400 may be performed in parallel with each other as needed.

In one embodiment, method 400 may begin at 405.

At 405, systems to be evaluated may be audited. The systems may be characterized and given dimensions of evaluations and scores. Information about applications and software may be obtained from third party databases. Repositories of information may be updated at client scanners. The time and scope of scanning of a given client may be scheduled.

At 410, using a determined scope of scan—such as a range of applications—, the system may be scanned. The scan may uniquely identify files and applications and match them to known values of vulnerabilities. Additional libraries or other components that may be accessed by the file being scanned may in turn be scanned. The structure of the file may be analyzed to determine what additional libraries or other components to scan.

At 415, vulnerabilities of the file may be recorded. Furthermore, vulnerabilities of the file may be associated with vulnerabilities of the libraries. The vulnerabilities may be reported to a server.

At 420, the vulnerabilities may be evaluated and augmented in view of contextual information about the environment of the system on which the file resides. Threat scores of the system may be determined and incorporated into the vulnerabilities. At 425, the vulnerabilities may be ranked or prioritized with respect to one another.

At 430, suitable corrective measures to correct for vulnerabilities may be identified, such as reinstallation, upgrades, changing settings, pentesting, or new instruction rules. At 435, corrective measures may be selectively applied according to their severity and the cost of the corrective measure. Some corrective measures may be postponed or omitted.

At 440, it may be determined whether a scan will be repeated for elements associated with changes made in 435. If so, method 400 may repeat at 410 for the changed elements. Otherwise, at 445 it may be determined whether a scan period has ended, wherein scans will be repeated. If so, method 400 may repeat at 410. Otherwise, at 450 it may be determined whether changed conditions, such as in the nature of threats or of the system, require rescan. If so, method 400 may repeat at 410 for the elements associated with the changes. Otherwise, at 455 it may be determined whether method 400 should terminate. If not, method 400 may repeat at, for example, 445. Otherwise method 400 may terminate.

Method 400 may be implemented fully or in part by instructions on computer-readable media for execution by a processor. For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other electromagnetic and/or optical carriers; and/or any combination of the foregoing.

Although the present disclosure has been described in detail, it should be understood that various changes, substitutions, and alterations can be made hereto without departing from the spirit and the scope of the disclosure as defined by the appended claims.

What is claimed is:

1. A system, comprising:
    a processor; and
    a memory medium that is coupled to the processor and that includes instructions, when executed by the processor, cause the system to:
        analyze an application file structure of an application and an import table of the application to identify, via the at least one of the application file structure of the application and the import table of the application, one or more uniquely identified application components;
        determine vulnerabilities associated with a given application component of the one or more uniquely identified application components, the vulnerabilities including vulnerabilities of one or more additional components to be accessed by the given application component;
        take remedial action based at least upon the vulnerabilities;
        after the remedial action is taken:
            repeat a scan of the given application component;
            determine, based at least on the repeat of the scan of the given application component, that the remedial action corrected at least one of the vulnerabilities associated with the given application component, present before the remedial action is taken on the given application component;
            determine, based at least on the repeat of the scan of the given application component, one or more new vulnerabilities associated with the given application component;
            determine from an interplay of the vulnerabilities of the given application component, that includes the one or more new vulnerabilities, that corrective action is necessary; and
            adjust a network security device to defeat at least one of the one or more new vulnerabilities for the corrective action.

2. The system of claim 1, wherein the instructions further cause the system to adjust characterizations of the vulnerabilities associated with the given application component based at least upon contextual information from the system in which the given application component resides, the contextual information including security information.

3. The system of claim 2, wherein, to take the remedial action, the instructions further cause the system to take the remedial action based at least on adjusted vulnerability characterizations.

4. The system of claim 2, wherein, to take the remedial action, the instructions further cause the system to take the remedial action based at least on a security configuration of the system related to the vulnerabilities.

5. The system of claim 2, wherein the instructions further cause the system to:
    determine a measure of the vulnerabilities; and
    rank the vulnerabilities.

6. The system of claim 2, wherein the instructions further cause the system to:
    determine a measure of the vulnerabilities including a composite score from a plurality of vulnerability factors; and
    rank the vulnerabilities.

7. The system of claim 2, wherein, to adjust characterizations of the vulnerabilities, the instructions further cause the system to adjust characterizations of the vulnerabilities based at least on contextual information including threat vectors, threat impacts, and enterprise maturity of the system.

8. The system of claim 2, wherein, to adjust characterizations of the vulnerabilities, the instructions further cause the system to adjust characterizations of the vulnerabilities based at least on two or more of an access vector, access complexity, authentication, confidential impact, integrity impact, availability impact, exploitability, remediation level, report confidence, collateral damage potential, target distribution, confidentiality, availability requirement, integrity requirement, and availability requirement.

9. The system of claim 2, wherein, to adjust characterizations of the vulnerabilities, the instructions further cause the system to adjust characterizations of the vulnerabilities based at least on a determined change in a threat causing at least one of the vulnerabilities.

10. The system of claim 1, wherein the instructions further cause the system to identify pentesting suggestions to further confirm presence of the vulnerabilities based upon identities of the vulnerabilities.

11. The system of claim 1, wherein, to take the remedial action, the instructions further cause the system to take the remedial action in a form of changed intrusion detection or protection rules based upon identities of the vulnerabilities.

12. The system of claim 1, wherein the instructions further cause the system to repeat a scan of the given application component based at least on a determination that a threat associated with the vulnerabilities has changed.

13. The system of claim 1, wherein the network security device includes a firewall.

14. At least one non-transitory machine readable storage medium that includes instructions that, when executed by a processor of a system, cause the system to:
analyze an application file structure of an application and an import table of the application to identify, via the at least one of the application file structure of the application and the import table of the application, one or more uniquely identified application components;
determine vulnerabilities associated with a given application component of the one or more uniquely identified application components, the vulnerabilities including vulnerabilities of one or more additional components to be accessed by the given application component;
take remedial action based at least upon the vulnerabilities;
after the remedial action is taken:
repeat a scan of the given application component;
determine, based at least on the repeat of the scan of the given application component, that the remedial action corrected at least one of the vulnerabilities associated with the given application component, present before the remedial action is taken on the given application component;
determine, based at least on the repeat of the scan of the given application component, one or more new vulnerabilities associated with the given application component;
determine from an interplay of the vulnerabilities of the given application component, that includes the one or more new vulnerabilities, that corrective action is necessary; and
adjust a network security device to defeat at least one of the one or more new vulnerabilities for the corrective action.

15. The at least one non-transitory machine readable storage medium of claim 14, wherein the instructions further cause the system to adjust characterizations of the vulnerabilities associated with the given application component based at least upon contextual information from the system in which the given application component resides, the contextual information including security information.

16. The at least one non-transitory machine readable storage medium of claim 15, wherein, to take the remedial action, the instructions further cause the system to take the remedial action based at least on adjusted vulnerability characterizations.

17. The at least one non-transitory machine readable storage medium of claim 15, wherein, to take the remedial action, the instructions further cause the system to take the remedial action based at least on a security configuration of the system related to the vulnerabilities.

18. The at least one non-transitory machine readable storage medium of claim 15, wherein the instructions further cause the system to:
determine a measure of the vulnerabilities; and
rank the vulnerabilities.

19. The at least one non-transitory machine readable storage medium of claim 15, wherein the instructions further cause the system to:
determine a measure of the vulnerabilities including a composite score from a plurality of vulnerability factors; and
rank the vulnerabilities.

20. The at least one non-transitory machine readable storage medium of claim 15, wherein, to adjust characterizations of the vulnerabilities, the instructions further cause the system to adjust characterizations of the vulnerabilities based at least on contextual information including threat vectors, threat impacts, and enterprise maturity of the system.

21. The at least one non-transitory machine readable storage medium of claim 15, wherein, to adjust characterizations of the vulnerabilities, the instructions further cause the system to adjust characterizations of the vulnerabilities based at least on two or more of an access vector, access complexity, authentication, confidential impact, integrity impact, availability impact, exploitability, remediation level, report confidence, collateral damage potential, target distribution, confidentiality, availability requirement, integrity requirement, and availability requirement.

22. The at least one non-transitory machine readable storage medium of claim 15, wherein, to adjust characterizations of the vulnerabilities, the instructions further cause the system to adjust characterizations of the vulnerabilities based at least on a determined change in a threat causing at least one of the vulnerabilities.

23. The at least one non-transitory machine readable storage medium of claim 14, wherein the instructions further cause the system to identify pentesting suggestions to further confirm presence of the vulnerabilities based upon identities of the vulnerabilities.

24. The at least one non-transitory machine readable storage medium of claim 14, wherein, to take the remedial action, the instructions further cause the system to take the remedial action in a form of changed intrusion detection or protection rules based upon identities of the vulnerabilities.

25. The at least one non-transitory machine readable storage medium of claim 14, wherein the instructions further cause the system to repeat a scan of the given application component based at least on a determination that a threat associated with the vulnerabilities has changed.

26. The at least one non-transitory machine readable storage medium of claim 14, wherein the network security device includes a firewall.

27. A method, comprising:
analyzing an application file structure of an application and an import table of the application to identify, via the at least one of the application file structure of the application and the import table of the application, one or more uniquely identified application components;

determining vulnerabilities associated with a given application component of the one or more uniquely identified application components, the vulnerabilities including vulnerabilities of one or more additional components to be accessed by the given application component;

taking remedial action based at least upon the vulnerabilities;

after the remedial action is taken:
repeating a scan of the given application component;
determining, based at least on the repeat of the scan of the given application component, that the remedial action corrected at least one of the vulnerabilities associated with the given application component, present before the remedial action is taken on the given application component;
determining, based at least on the repeat of the scan of the given application component, one or more new vulnerabilities associated with the given application component;
determining from an interplay of the vulnerabilities of the given application component, that includes the one or more new vulnerabilities, that corrective action is necessary; and
adjusting a network security device to defeat at least one of the one or more new vulnerabilities for the corrective action.

28. The method of claim 27, further comprising:
adjusting characterizations of the vulnerabilities associated with the given application component based at least upon contextual information from the system in which the given application component resides, the contextual information including security information.

29. The method of claim 28, wherein the taking the remedial action includes taking the remedial action based at least on adjusted vulnerability characterizations.

30. The method of claim 28, wherein the taking the remedial action includes taking the remedial action based at least on a security configuration of the system related to the vulnerabilities.

31. The method of claim 28, further comprising:
determining a measure of the vulnerabilities; and
ranking the vulnerabilities.

32. The method of claim 28, further comprising:
determining a measure of the vulnerabilities including a composite score from a plurality of vulnerability factors; and
ranking the vulnerabilities.

33. The method of claim 28, wherein the adjusting characterizations of the vulnerabilities includes adjusting characterizations of the vulnerabilities based at least on contextual information including threat vectors, threat impacts, and enterprise maturity of the system.

34. The method of claim 28, wherein the adjusting characterizations of the vulnerabilities includes adjusting characterizations of the vulnerabilities based at least on two or more of an access vector, access complexity, authentication, confidential impact, integrity impact, availability impact, exploitability, remediation level, report confidence, collateral damage potential, target distribution, confidentiality, availability requirement, integrity requirement, and availability requirement.

35. The method of claim 28, wherein the adjusting characterizations of the vulnerabilities includes adjusting characterizations of the vulnerabilities based at least on a determined change in a threat causing at least one of the vulnerabilities.

36. The method of claim 27, further comprising:
identifying pentesting suggestions to further confirm presence of the vulnerabilities based upon identities of the vulnerabilities.

37. The method of claim 27, wherein the taking the remedial action includes taking the remedial action in a form of changed intrusion detection or protection rules based upon identities of the vulnerabilities.

38. The method of claim 27, further comprising:
repeating a scan of the given application component based at least on a determination that a threat associated with the vulnerabilities has changed.

39. The method of claim 27, wherein the network security device includes a firewall.

\* \* \* \* \*